United States Patent                                                    [11] 3,624,070

| [72] | Inventor | Walter G. Hunt |
|------|----------|----------------|
|      |          | Bridgeton, Mo. |
| [21] | Appl. No.| 526,710        |
| [22] | Filed    | Feb. 11, 1966  |
| [45] | Patented | Nov. 30, 1971  |
| [73] | Assignee | Anheuser-Busch, Incorporated |
|      |          | St. Louis, Mo. |
|      |          | Original application Apr. 29, 1963, Ser. No. 276,200, now abandoned. Divided and this application Feb. 11, 1966, Ser. No. 526,710 |

[54] GRANULAR GELATINIZABLE QUATERNARY AMMONIUM STARCH ETHERS AND PROCESS OF MAKING SAME
21 Claims, No Drawings

[52] U.S. Cl. .................................................. 260/233.3
[51] Int. Cl. ..................................................... C08b 19/06
[50] Field of Search ........................................... 260/233.3, 576.6, 165; 117/139.5, 165

[56] References Cited
UNITED STATES PATENTS

| 3,378,547 | 4/1968  | Patel ............................ | 260/233.3 |
| 2,773,057 | 12/1956 | Hjermstad et al ............... | 260/233.3 |
| 2,802,000 | 8/1957  | Caldwell ........................ | 260/233.3 |
| 2,817,664 | 12/1957 | Cavallito et al ................ | 260/293   |
| 2,825,727 | 3/1958  | Caldwell ........................ | 260/233.3 |
| 3,062,810 | 11/1962 | Hjermstad et al ............... | 260/233.3 |
| 3,152,925 | 10/1964 | Patel et al ..................... | 127/33    |

*Primary Examiner*—Donald E. Czaja
*Assistant Examiner*—Ronald W. Griffin
*Attorney*—Gravely, Lieder & Woodruff

ABSTRACT: The invention relates to the preparation of granular, gelatinizable quaternary ammonium starch ethers from starch and an amine alkene halide and to such starch ethers.

GRANULAR GELATINIZABLE QUATERNARY AMMONIUM STARCH ETHERS AND PROCESS OF MAKING SAME

The present application is a division of my prior copending application, Ser. No. 276,200 filed Apr. 29, 1963, now abandoned.

This invention relates to new derivatives of starch and to process of making same, and in particular, this invention relates to the preparation of granular, gelatinizable quaternary ammonium starch ethers.

The principal object of this invention is to prepare a cationic starch ether using an amino or quaternary ammonium alkene halide salt in which the halide group is sufficiently activated so that the etherification reaction with the starch is carried out at high reagent yields in aqueous slurry under controlled conditions of alkalinity without the use of a gelatinization-retarding chemical such as sodium sulfate to prevent pasting of the starch.

For simplicity the reagents described will be referred to subsequently as amino alkene halide salts, and it is understood that this term will include quaternary ammonium alkene halide salts. The most practical of the alkene radicals useful in this type of compound is the butene radical, although other conjugated alkene radicals of symmetrical structure such as hexadiene -2,4 and octatriene -2,4,6 will react in the same way.

Still another object of this invention is to provide new substituted starch products having properties which make them suitable for a variety of uses. These granular starch ethers have reduced gelatinization temperatures to form pastes of increased viscosity which maintain their fluidity after cooling and standing. The products of this invention may be gelatinized and drum dried to make them cold water soluble.

A further object of this invention is to increase the affinity of starch for negatively charged fibers such as cellulose so as to improve pigment retention during formation of paper. This characteristic may also make these starch ethers useful as flocculating agents for negatively charged colloids, as suspending agents, and as sizing agents.

Another principal object of the present invention is to provide new reaction products of an amine or an amine salt and a dihaloalkene which I call amine alkene halides. Still another object is to provide a method of making a starch etherifying agent by reacting an amine, preferably a tertiary amine, or an amine salt with a dihalobutene, preferably dichlorobutene, and removing the unreacted dihalobutene, so that the final product, when reacted with starch produces a granular starch ether which can be gelatinized and which has increased affinity for negatively charged fibers.

Still another object is to provide a cold water soluble gelatinized starch ether from the reaction product of an amine butene halide and granular starch.

The present invention comprises a starch ether produced by reacting starch with an amine alkene halide and the method of making same. The present invention also includes cold water soluble gelatinized starches made from said starch ethers. The present invention also includes the reaction product of amines or amine salts and dihaloalkenes and the method of making same preferably including the removal of unreacted dihaloalkene from the product.

I have found that nitrogenated derivatives capable of etherifying with starch using the aforementioned conditions may be prepared by reacting dichlorobutene with an amine or amine salt; however, tertiary amines are best suited for the reaction, and may be represented by the formula $$R_1-N-R_2$$
$$|$$
$$R_3$$

wherein $R_1$, $R_2$ and $R_3$ are from the group consisting of alkyl, substituted alkyl, alkene, aryl or aralkyl.

The reaction between dichlorobutene and amine may be represented as follows using trimethylamine for illustrative purposes.

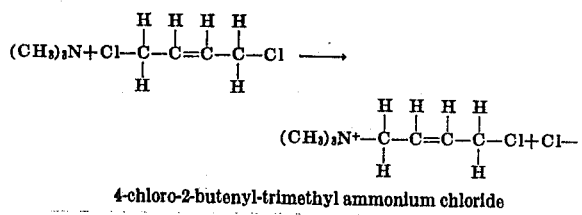

4-chloro-2-butenyl-trimethyl ammonium chloride

The reaction product may also be called N,N,N-trimethyl-N-4 chlorobutene-2 ammonium chloride and is a 4-halo-2-butenyl-trimethyl ammonium halide.

Hereinafter these amine salts will be referred to as amine butene halides. They etherify with starch using alkaline catalysts to form nitrogenated starch ethers; however, care must be taken to remove unreacted dichlorobutene from the amine butene halide reagent if the starch ether is to have the previously described characteristics.

It is well known in the art that when polyfunctional derivatizing agents such as dichlorobutene are used under alkaline pH conditions, the starch ethers thus formed are nongelatinizable in boiling water. Theoretical yields of the amine and dichlorobutene are not obtained; however, I have found that extracting the amine butene halide salt with a nonpolar solvent such as benzene removes unreacted dichlorobutene. When the extracted amine butene halide salt is etherified with starch the resulting quaternary ammonium starch ether salt is easily gelatinized in hot water forming a very clear, viscous, stable paste.

The reaction between my amine butene halide reagent represented by the structural formula:

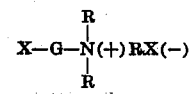

wherein X is halide, R is methyl and G is alkenylene and starch may be represented by the following equation using the reaction product of trimethylamine and dichlorobutene with calcium hydroxide as representative of reagent and catalyst respectively.

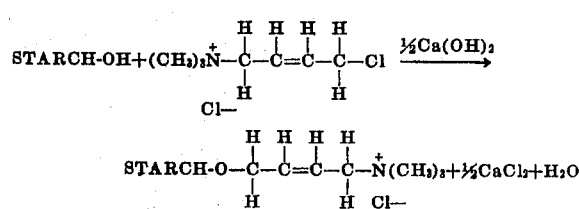

In making up the amine butene halide reagent, I prefer to use the tertiary amines, since under the conditions used, they do not further react with halides to form a variety of products as do the primary and secondary amines, thereby reducing the yields and purity of the reagent. Of the tertiary amines, trimethylamine appears to offer the most advantages, not only because it is the most economical but also because of its reactivity in this reaction; however, other tertiary amines such as dimethyl benzyl, dimethyl lauryl (Armeen DM12D), and triethyl are also very reactive. Higher molecular weight tertiary amines such as tri-n-propyl, N-methyl morpholine, N-methyl piperidine, methyl diallylamine, and pyridine may also be used but the alkylation reaction rates are considerably diminished. All tertiary amines capable of quaternizing with dichlorobutene also fall within the scope of this invention. Though the free amines are preferred, the corresponding amine salts may also be used after adding sufficient alkali to revert them to the free amines.

To prepare the amine butene halide reagent, equimolar quantities of the tertiary amine and dichlorobutene are mixed in 3-4 volumes of a nonpolar solvent such as benzene and allowed to stand with agitation until all the amine has reacted. In order to speed the reaction of the higher molecular weight amines, heat is used. The quaternary ammonium salt formed precipitates from solution and is collected by filtration on a Buchner funnel. The filter cake is resuspended in 2 volumes of solvent and refiltered to remove unreacted reagents. This procedure is repeated. More details as to the preparation and purification of the reagent are set forth in the examples to follow.

To prepare the starch derivatives described in this invention, the starch is suspended in a solvent such as water and an alkaline catalyst is added. Heat and increased concentrations of catalyst and reagent increase the reaction rate. By selecting the proper ratios of starch, catalyst, and reagent, reaction yields ranging up to 80 percent are easily obtained without the use of gelatinization-inhibiting salts in an aqueous solvent system. Reagent yields ranging from 90 to 95 percent are obtained in aqueous solvent systems using higher concentrations of alkali along with gelatinization-inhibiting salts.

A wide range of etherification reagent concentrations may be employed, but as the reagent concentration increases the percentage yields become lower. Theoretically as much as 3 mols of reagent can be reacted per anhydroglucose unit mol of starch, and allowing for somewhat less than theoretical yield, even more than this amount can be added. However, for practical reasons about 0.5 percent to about 10 percent of amine butene halide reagent by weight based on the weight of starch (0.44–8.85 mol percent) is usually added to the starch. Based on an 80 percent yield, from 0.0034 to 0.07 moles quaternary per mole of anhydroglucose unit is in the final product. About 2.5 to 4 percent reagent by weight (2.21–3.54 mol percent) is preferred. Salts and catalyst are removed after neutralization of the aqueous solvent medium by filtration.

High yields are also obtainable using inert solvents such as isopropyl alcohol as a reaction medium. A soluble catalyst such as trimethyl benzyl ammonium hydroxide is used and the slurry is then heated to complete the reaction.

To catalyze this etherification reaction, alkali metal hydroxides, alkaline earth hydroxides and oxides, and quaternary ammonium hydroxides may be used for satisfactory results. Basic salts such as trisodium phosphate and amines are also capable of catalyzing this reaction, but rates are greatly diminished.

The rate of reaction is dependent upon temperature and any temperature below the gelatinization temperature of the starch in the reaction medium may be used; however, temperatures just below this gelatinization point of the starch are preferred for granular products. Temperatures above the gelatinization temperature of the starch may be used when making gelatinized etherified products.

The etherification reaction has been carried out on raw, acid-modified, and oxidized corn starches and is applicable to all starches such as wheat, potato, tapioca, waxy maize, sago, or rice.

The invention is further described in the following examples.

EXAMPLE I

This example illustrates the preparation of the triethylamine dichlorobutene reagent.

Four moles (500 grams) of 1,4 dichlorobutene-2 and 4 moles (404 grams) of triethylamine are mixed with 3 liters of benzene. The solution is then heated with agitation to boiling and refluxed for 6 hours. The precipitated triethylamine dichlorobutene salt is collected by filtration and the filtrate reused as a solvent to repeat the foregoing procedure two times. The amine butene halide salt is resuspended in 2 volumes of benzene and filtered to remove unreacted dichlorobutene. This procedure is repeated in order to ensure that only minimum levels of dichlorobutene remain in the salt. 2,550 grams of the salt assaying 6.2 percent nitrogen are obtained for an overall yield of 93 percent.

EXAMPLE 2

This example illustrates the preparation of a starch ether using the amine butene halide reagent prepared in example 1.

The products in table I are prepared by slurrying 500 grams of corn starch (10 percent moisture) in 800 ml. of water and heating to 122° F. 16 grams of hydrated lime are added and the indicated amount of the amine butene halide salt added. The slurry is stirred for 17 hours and then adjusted to pH 2.5 with dilute hydrochloric acid (1 part concentrated HCl diluted with 4 parts water). The slurry is diluted to 13° B., filtered, the filter cake washed with 100 ml. of water on the filter, and dried.

TABLE I

| PRODUCT | A | B | C | D |
|---|---|---|---|---|
| Grams amine butene halide added | 20 | 25 | 30 | 35 |
| % N added (starch basis) | 0.26 | 0.34 | 0.41 | 0.47 |
| % N etherified | 0.21 | 0.24 | 0.32 | 0.35 |
| % Yield on reagent | 81 | 71 | 78 | 74 |
| Apparent D.S. (Calculated) | 0.024 | 0.028 | 0.037 | 0.04 |
| Gelatinization Temp. °C. | 62 | 61 | 58 | 58 |
| 30 Min. Viscosity | 260 | 270 | 240 | 200 |
| Paste after 24 hours | fluid | fluid | fluid | fluid |
| Cationicity | + | + | + | + |
| % Pigment retention | 50 | 54 | 56 | 54 |

D.S. or degree of substitution is defined as the average number of amino groups per each anhydroglucose unit of starch ($C_6H_{10}O_5$). Gelatinization temperatures and viscosities are measured in a Corn Industries Viscometer using a slurry containing 5 percent starch solids. All pastes are fluid after standing for 24 hours at room temperature and paste clarity is greatly increased over untreated starch pastes.

Cationicity of the granular starch is determined by its increased affinity for the anionic dye light green SF yellowish and of 0.5 percent starch pastes by its migration to the cathode in an electrolytic cell.

pigment retention is determined by dispersing 14 grams of a standard freeness pulp in 8,000 ml. water. 12.5 percent $TiO_2$, 2 percent starch paste, 2 percent Acco Rosin, and 3 percent papermakers' alum are added based on the dry weight of the pulp. Paper sheets are formed and dried. The increase in ash over a blank not containing pigment determines the amount of pigment retained.

EXAMPLE 3

This example illustrates the effect of increased temperatures on the yield of the reaction.

The procedure, reagents, and amount of reagents specified in example 2–C (table I) are used with the exception that the temperature is increased to 126°–127° F. instead of 122° F. The starch obtained assayed 0.39 percent etherified N giving a D.S. 0.0045 and a yield of 95 percent on the reaction.

EXAMPLE 4

This example illustrates the effect of increased alkalinity on the yield of the reaction.

The procedure, reagents, and amounts of reagents specified in example 2–C (table I) are used except that 800 ml. of a saturated aqueous sodium sulfate solution (74.72 percent on the basis of the starch weight) in which 20 grams of NaOH are dissolved is used as a reaction medium and catalyst instead of the reaction medium and catalyst described in example 2. The starch ether obtained assays 0.38 percent etherified N giving a D.S. of 0.044 and yield of 93 percent on the reaction.

EXAMPLE 5

This example illustrates the effect of lower alkalinity ranges on the yield of the reaction.

The procedure, reagents, and quantities of reagents specified in example 2–C (table I) are used except 50 grams of Na₃PO₄ are used to replace the 16 grams of hydrated lime as a catalyst. The starch obtained assays 0.172 percent etherified N giving a D.S. of 0.02 with a yield of 41 percent.

EXAMPLE 6

The reagents, proportions of reagents, and procedures described in example 2–C (table I) are used except a sodium hypochlorite oxidized and an acid-converted corn starch modified to the 55 and 60 fluidity levels respectively are used to replace raw corn starch. The reaction yields and characteristics of these products are as described except that they form less viscous pastes.

EXAMPLE 7

This example illustrates the preparation of the trimethylamine and dischlorobutene reagent.

Two hundred and ten grams (1.67 M) dichlorobutene in 1,500 ml. of benzene and a 100-gram ampule of trimethylamine are cooled to −10° C. The amine is then mixed with the dichlorobutene and allowed to stand overnight in the deep freeze at −10°. The slurry is then placed in a pressure reactor, sealed, and heated to 65°–70° C. with agitation for 4 hours to complete the reaction. The salt is collected and washed two times with 2 volumes of benzene to remove unreacted dichlorobutene. 295 grams of salt assaying 7.7 percent N are obtained for a yield of 96 percent.

EXAMPLE 8

This example illustrates the preparation of a starch ether using the amine butene halide reagent described in example 7.

The products in table II are prepared by slurrying 500 grams of corn starch (10 percent moisture) in 800 ml. of water and heating to 122° F. 16 grams of hydrated lime and the indicated amount of amine butene salt are added. The slurry is stirred for 17 hours and then adjusted to pH 2.5 with dilute hydrochloric acid. The slurry is diluted to 13° B., filtered, the filter cake washed with 100 ml. of water on the filter, and dried.

TABLE II

| Product | A | B | C |
| --- | --- | --- | --- |
| Grams reagent added | 10 | 15 | 20 |
| % N added | 0.167 | 0.25 | 0.34 |
| % N etherified | 0.158 | 0.20 | 0.24 |
| % Yield on reagent | 95 | 80 | 71 |
| Apparent D.S. (calc.) | 0.018 | 0.023 | 0.028 |
| Gelatinization temp. °C. | 68 | 66 | 65 |
| 30 min. viscosity | 125 | 140 | — |
| Paste after 24 hours | fluid | fluid | fluid |
| Cationicity | + | + | + |
| % Pigment Retention | 45 | 48 | 52 |

EXAMPLE 9

The procedure, reagents, and quantities of reagents specified in example 4 are used except that 25 grams of reagent described in example 7 are used to replace triethylamine-dichlorobutene product. The product obtained assays 0.40 percent etherified N giving a D.S. of 0.045 and yield of 94 percent. Gelatinization temperature of a 5 percent suspension was 62° C. and a pigment retention of 54 percent was obtained.

EXAMPLE 10

This example illustrates the preparation of starch ether using the amine butene halide reagent to produce a cold water soluble product.

To 500 grams of starch uniformly suspended in 800 ml. of water are added 16 grams of hydrated lime and 20 grams of amine butene halide reagent described in example 7. Agitation is maintained for 17 hours at 122° F. at which time sufficient dilute HCl is added to adjust the pH to 2.5. The starch is collected by filtration, washed to remove salts and resuspended in water. The suspension is then heated at 190°–195° F. with agitation until the starch ether is completely gelatinized and the dispersion passed between revolving drums heated to a steam pressure of 140 p.s.i. The dried product is pulverized and is readily dispersible in water at room temperatures to give a clearer, more stable and viscous dispersion then a corresponding dispersion made by cooking an untreated starch.

As shown in the examples, reaction rates and yields are dependent upon temperature, alkalinity, and reagent concentration. Both types of amine butene halide derivatives have about the same reaction rates; thus the higher molecular weight amine butene halide derivatives should show this same order of reactivity.

Higher reaction rates are obtained using the alkali metal hydroxides instead of the alkaline earth hydroxides or oxides as catalysts; however, with the alkali metal hydroxides, constant pH adjustments or the use of a gelatinization inhibiting salt are required. The use of an alkaline earth oxide such as hydrated lime is preferred, since at the conditions specified, fairly high reagent yields are obtained on the etherification reaction without the use of gelatinization inhibiting salts or continuous pH control. If hydrated lime is used as a catalyst, then the use of hydrochloric acid for pH adjustment is preferred, since the catalyst is converted to the soluble chloride salt facilitating removal by filtration; however, other acids such as acetic or nitric also may be used.

The introduction of the quaternary ammonium salts onto the starch molecule reduces the gelatinization temperature, improves paste stability, viscosity, and clarity. Quaternary ammonium salts as such are not dependent on pH to maintain a positive charge. These starch ethers have a high affinity for negatively charged dyes and fibers. It was found that these starch ethers having a D.S. of 0.037 were capable of increasing the pigment retention of beater additives to 55 percent, while untreated starch under similar conditions has a pigment retention of 27.9 percent, when used as a paste at the 2 percent level based on the weight of the pulp. In order to obtain this degree of increase in pigment retention, unreacted dichlorobutene must be removed from the amine butene halide reagent.

This invention is intended to cover all changes and modifications of the examples herein chosen for purposes of the disclosure, which do not constitute departures from the spirit and scope of the invention.

What is claimed is:

1. A starch ether consisting of the reaction product of starch and from about 0.5 percent to about 10 percent of an amine alkene halide.

2. The product of claim 1 wherein the amine alkene halide is a quaternary ammonium butene halide.

3. The product of claim 2 wherein the amine butene halide is the quaternary ammonium salt of the reaction product of trimethylamine and dichlorobutene-2.

4. The product of claim 1 wherein the reaction product is a cold water soluble gelatinized starch ether.

5. A cationic starch consisting essentially of the reaction product of starch suspended in an aqueous medium with a quaternary ammonium butene halide.

6. A cationic starch consisting essentially of the reaction product of starch suspended in an aqueous medium with 4-halo-2-butenyl-trimethyl ammonium chloride.

7. A cationic starch consisting essentially of a reaction product of starch suspended in an aqueous medium with about 2.21 to about 3.54 mol percent, based on the $C_6H_{10}O_5$ starch unit, of 4-halo-2-butenyl-trimethyl ammonium chloride.

8. A method of making a starch ether comprising the step of reacting starch with from about 0.5 percent to about 10 percent of an amine alkene halide at a temperature below the gelatinization temperature of the starch in the presence of an alkaline catalyst and in the absence of a gelatinization inhibitor.

9. The method of claim 8 wherein the amine butene halide is a tertiary amine butene halide.

10. The method of claim 8 wherein the amine butene halide is the quaternary ammonium salt of the reaction product of trimethylamine and dichlorobutene-2.

11. A method of claim 8 further comprising the step of gelatinizing the reaction product.

12. The method of claim 8 wherein the alkaline catalyst is hydrated lime.

13. Process for preparing cationic starch comprising reacting starch suspended in an aqueous medium with 4-halo-2-butenyl-trimethyl ammonium halide in the presence of an alkali.

14. The process as claimed in claim 13 wherein the starch is reacted with 4-chloro-2-butenyl-trimethyl ammonium chloride.

15. The process as claimed in claim 13 wherein the aqueous medium is heated up to 122° F.

16. The process as claimed in claim 13 wherein a gelatinization inhibitor is added to the aqueous suspension of the starch.

17. The process as claimed in claim 16 wherein 74.72 percent of a gelatinization inhibitor is added on the basis of the starch weight, the gelatinization inhibitor being sodium sulfate.

18. The process for the manufacture of quaternary ammonium starch ethers, wherein an etherifying agent containing a quaternary ammonium group is reacted with a suspension of granule starch under nongelatinizing conditions of alkalinity and temperature, comprising employing as said etherifying agent a compound represented by the structural formula:

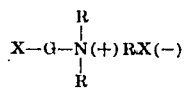

wherein X is a halide, R is methyl and G is alkenylene.

19. The process of claim 18 wherein G contains four carbons.

20. The process for the manufacture of quaternary ammonium starch ethers, comprising reacting a haloalkenylene quaternary with an aqueous alkaline suspension of granule starch, said quaternary being reacted with said starch under nongelatinizing conditions of alkalinity and temperature in the proportions of 0.004 to 0.088 mole per mole of starch, said reaction being continued until said starch contains from 0.0034 to 0.07 quaternary ether group per anhydroglucose unit, said haloalkenylene quaternary being represented by the structural formula:

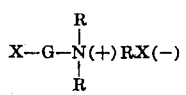

wherein G is alkenylene, R is selected from methyl and ethyl and X is a halide.

21. The process of claim 20 wherein R is methyl and wherein G contains four carbons.

* * * * *